Patented May 2, 1933

1,906,357

UNITED STATES PATENT OFFICE

HAROLD E. BECKMAN, OF WHITE PLAINS, NEW YORK, ASSIGNOR TO SPRINGFIELD FACING COMPANY, OF SPRINGFIELD, MASSACHUSETTS, A CORPORATION OF MASSACHUSETTS

PARTING COMPOUND FOR TREATING SAND MOLDS

No Drawing. Application filed October 6, 1931. Serial No. 567,306.

This invention relates to a new composition of matter for the treatment of sand molds. Such compositions as are here involved are generally called parting compounds, although in the present invention the composition is wholly a mechanical mixture, there being no chemical reaction, so far as I am aware, between the ingredients of the mixture.

In the practice of flask molding with sand wherein a cope and a drag are employed, the necessity for separating the same in removing the pattern and completing the mold, calls for special treatment of the molded sand portion of the surfaces which are to be separated from one another. The continuous surfaces which are to be separated are known as the parting surfaces of the mold.

The object of the present invention is to provide an improved composition of material in a dry highly comminuted state of fineness for application to said parting surfaces whereby a clean separation thereof may be accomplished with far greater facility and effectiveness than heretofore; this also without derangement of the molded sand of said parting surfaces and whereby said surfaces will be maintained smooth and intact during the manipulation of said mold sections in completing the mold.

A further object is to provide a compound which may be obtained at low cost and prepared wholly by mechanical mixing and grinding without the necessity of precipitation from solutions or of drying by special roasting methods such as have heretofore been commonly employed in the preparation of such compounds. The ingredients selected for the present compound are free of objection from the standpoint of health for the molder and there will be no danger of incurring any occupational disease in its use,— an important consideration in a molder's shop wherein the dust of all sorts of materials is in almost constant suspension in the air.

The parting compound of the present invention comprises a homogeneous mixture of a calcareous material, preferably carbonate of lime in a preponderating amount, with a relatively small amount of a metal stearate, preferably aluminum stearate. The stearate should form but a minor fraction of the compound as compared with the calcareous material, its function being principally that of rendering the compound water repellent, slippery and non-sticky. Molding sand generally contains a slight amount of moisture to give it good cohesive strength in the formation of the mold, and this likewise tends to make it more adhesive to the pattern being molded. Consequently, the water repellent characteristic of the present compound serves in its application to said parting surfaces to weaken this strength of attachment between said surfaces and enables a clean cut smooth separation thereof to take place.

A suitable composition for the present compound is 97 parts by weight of the carbonate of lime and 3 to 7 parts by weight of the aluminum stearate. The variable quantity of the stearate employed affects the water repellent characteristic of the compound since the greater the proportion of stearate, the greater will be the water repellent characteristic. I have found that approximately 3 parts of aluminum stearate in the mixture will render it sufficiently water repellent for good parting characteristics, and yet sufficiently penetrable for moisture to enable particular portions of the sand mold to be moistened by sponging or swabbing after the parting compound has been applied thereto. When no sponging or swabbing of the sand mold is desired, a compound with approximately 7 parts aluminum stearate is preferably employed. Substantially more than 7 parts of aluminum stearate in the compound is unnecessary for obtaining all of the water repellent characteristic of the compound necessary or desired.

The preparation of the present parting compound is accomplished by merely mixing the ingredients thereof mechanically and of grinding the same together into the form of an impalpable powder. The mixing should be carried along far enough to render the compound thoroughly homogeneous throughout. No roasting or special drying process is required, and the material thus mixed and ground together may be shipped immediately for use.

The parting compound as thus prepared is to be applied as a very thin coating to the parting surfaces of the mold, that is, the surfaces which are to be separated in removing the pattern and completing the mold, and various methods of application may be resorted to depending on the practice of the molder and his class of molding. In general the application of the coating should be by dusting, as by means of the usual shake bag, a thin coating of the compound upon the surface of the pattern and its support within the mold prior to the introduction of the molding sand thereto. According to all the various types of flask molding, each instance of placing the molding sand against the pattern and its bed or support will establish parting surfaces to be thereafter separated in removing the pattern, and said parting surfaces should be preliminarily treated by the application as aforesaid of the thin coating of parting compound described. In this way the surfaces may be separated easily and cleanly with a maintenance of the molded sand in perfect form for casting.

What I claim is:

1. A parting compound for application to the parting surfaces of sand molds comprising a dry, homogeneous, mechanical mixture reduced to an impalpable powder, containing in great preponderance a calcareous material and a minor fraction of a metal stearate.

2. A parting compound for application to the parting surfaces of sand molds comprising a dry, homogeneous, mechanical mixture reduced to an impalpable powder containing in great preponderance a calcareous material and a minor fraction of a metal stearate, the proportion of said stearate being sufficient to make said mixture water repellent.

3. A parting compound for application to the parting surfaces of sand molds comprising a dry, homogeneous, mechanical mixture reduced to an impalpable powder containing in great preponderance a calcareous material and a minor fraction of a metal stearate, the proportion of said stearate being sufficient to make said mixture water repellent but not sufficient to make said mixture moistureproof.

4. A parting compound for application to the parting surfaces of sand molds comprising a dry, homogeneous, mechanical mixture reduced to an impalpable powder containing in great preponderance carbonate of lime and a minor fraction of aluminum stearate.

5. A parting compound for application to the parting surfaces of sand molds comprising a dry, homogeneous, mechanical mixture reduced to an impalpable powder containing in approximate proportion by weight 97 parts of carbonate of lime and 3 to 7 parts of aluminum stearate.

6. The method of treating the parting surfaces of sand molds which consists in coating said surfaces with an extremely thin deposit of an impalpable powdery mixture of a calcareous material and a metal stearate, characterized by being water repellent, whereby the sections of said mold may be separated along predetermined parting surfaces thereof without derangement of the molded sand portions of said surfaces.

In testimony whereof I have affixed my signature.

HAROLD E. BECKMAN.